US006152644A

United States Patent [19]

Hein

[11] Patent Number: 6,152,644

[45] Date of Patent: Nov. 28, 2000

[54] DEVICE FOR CONNECTING TWO COMPONENTS

[75] Inventor: Dierk Hein, Burgwedel, Germany

[73] Assignee: WABCO GmbH, Hannover, Germany

[21] Appl. No.: 09/198,641

[22] Filed: Nov. 24, 1998

[30] Foreign Application Priority Data

Sep. 12, 1997 [DE] Germany .......................... 197 54 528

[51] Int. Cl.[7] ........................................ F16B 1/00

[52] U.S. Cl. .......................... 403/321; 403/341; 403/286; 403/322.4

[58] Field of Search ................................ 403/322.4, 321, 403/322.1, 303, 309, 286, 341, 213, 209, 293; 15/250.32

[56] References Cited

U.S. PATENT DOCUMENTS

| | | | |
|---|---|---|---|
| 4,370,775 | 2/1983 | Van Den Berg et al. | 15/250.32 |
| 5,289,608 | 3/1994 | Kim | 15/250.32 |
| 5,611,103 | 3/1997 | Lee | 15/250.32 |
| 5,788,393 | 8/1998 | Verberne | 403/286 X |

FOREIGN PATENT DOCUMENTS

| | | |
|---|---|---|
| 8908016 | 10/1989 | Germany . |
| 3937022 | 9/1990 | Germany . |
| 9317564 | 5/1994 | Germany . |
| 4421612 | 1/1995 | Germany . |
| 29708217 | 8/1997 | Germany . |
| 1242805 | 9/1989 | Japan . |
| 1599468 | 4/1978 | United Kingdom . |

OTHER PUBLICATIONS

Roberts and Lapidge, Manufacturing Processes, pp. 10–11, 352, 357–358, 1977.

Elektrische Steckverbinder, Katalog C 11 of Contact Electronics Inc. (Oct., 1983).

*Primary Examiner*—Lynne H. Browne
*Assistant Examiner*—John R. Cottingham
*Attorney, Agent, or Firm*—Proskauer Rose LLP

[57] ABSTRACT

A device for connecting a first component to a second component includes a first lever provided with a first opening which, together with an axle on the first component forms a rotating articulation around which the first lever can be rotatably connected to the first component for rotation relative the first component. The lever is provided with a holding element which extends over the second component and engages an additional holding element located on thereon to connect the first component to the second component. In order to simplify the production of the first lever and to allow for assembly without using any tools, the first lever is fabricated from a strip of sheet metal by means of punching out and deformation, or is alternatively in the form of an extruded plastic part. The first opening is connected with an insertion cut-out which has a smaller diameter in the transitional area in a region adjacent the first opening than the axle. This configuration allows the lever to be rotatably mounted to the first component by simply snapping it on the axle. The holding element is defined by a wall on the lever which delimits a second opening of the lever and an insertion cut-out connected therewith. A projection following the wall and extending parallel to additional holding element located on the second component is made in the form of an enlarged running surface and support for engaging the additional holding element. Such structure obviates disposition of a roller on the holding element, as provided in known devices for the connection of two components to each other.

12 Claims, 2 Drawing Sheets

DEVICE FOR CONNECTING TWO COMPONENTS

BACKGROUND OF THE INVENTION

The invention relates to a device for connecting a first component to a second component, and more particularly a snap-on connector for connectively bridging the two components.

A connector of this type is known from the catalogue C1 entitled "Elektrische Steckverbinder" (Electrical Plug-in Connections) of Oct. 1, 1983, published by the company Contact GmbH, Stuttgart, Germany.

The known connector consists essentially of two levers which are arranged parallel to each other and are interconnected by means of a bridging element. The shackle thus formed by the two levers and the bridging part extending therebetween fits over a first component and a second component connected to, the two levers extending laterally over the two abutted components. Each of the two levers has an opening at an end thereof for receiving an axle which is attached to the first component. Each of the two axles received in the opening of a corresponding lever permits rotating articulation by means of which the shackle is held on the first component in a manner allowing rotation thereof relative to the first component. The other end of each lever is provided with a projection to which a roller is attached at the free end thereof. The projection-mounted roller serves as a holding element which engagably extends over a corresponding holding element mounted on the second component when the shackle is rotated in the direction of the second component.

In mounting the known shackle to a component, the device must be properly positioned relative to the first component such that the openings in the levers are aligned with the corresponding openings in the first component. The axles must then be introduced through the openings in the levers and into the corresponding openings in the first component, and subsequently attached to the first component.

When a shackle configuration for a connecter of the above type is not desired and/or is not required by the particular application, it is possible to dispense with the second lever and the bridging part, and to use merely one lever of the type described above as a device to connect two components to each other.

It is the therefore the object of the invention to create a connecting device of the type mentioned above, consisting of at least one lever, which is simple to manufacture and which can easily be mounted on the two components to be connected.

SUMMARY OF THE INVENTION

In accordance with these and other objects of the invention, there is provided a device for connecting a first component to a second component in abutted contact therewith, the first component including an axle extending from one side thereof. The device is comprised of a lever including means for providing rotating articulation carried thereon and cooperative with the axle, provided for example in the form of an opening in which the axle is rotatably receivable. The lever further includes a holding element for engaging an additional holding element when the lever is rotated about the axle in a direction of the second component. The additional holding element extends from a side of the second component facing a direction common with the side of the first component from which the axle extends when the first and second components are brought into abutted engagement for connection to one another. The lever further includes an insertion cut-out continuous with the opening configured to permit insertion of the axle therein, a boundary of the insertion cut-out being defined by two walls opposed to one another. One of the two walls presents an elastically deformable area therealong, the elastically deformable area being disposed in a region adjacent the opening. A distance between at least a partial area of the elastically deformable area and a remaining one of the two walls across therefrom is shorter than a diameter of the first axle.

Briefly stated, the device in accordance with the invention permits connection of two components to each other by a connector which can be snapped on the axle by virtue of the arrangement and special configuration of an insertion cut-out connected to an opening in which the axle is receivable and which can thus be easily connected to the first component.

In a particularly advantageous embodiment, the entire device for the connection of two components to each other is optionally manufactured in the form of a simple sheet-metal part, conveniently accomplished by punching out and forming the finished connector. Alternatively, the connecting device can be made in the form of an extruded plastic part. By virtue of the structural design of the connecting device in accordance with the invention, no additional components are required for its completed construction. In addition, no tools are required to mount the device on the first component.

In accordance with the known connecting device described above, a roller is provided on each of the two holding elements of the device made in form of a shackle. Before mounting the shackle, each roller must be rotatably attached on an axle carried on the holding element. This requires additional expense in the manufacture of the known device.

Therefore, in another advantageous embodiment in furtherance of an object of the invention, the holding element located on the lever is defined by a wall delimiting an additional opening with an insertion cut-out, whereby the wall constitutes an enlarged running surface. Such configuration obviates the installation of a conventional roller on the holding element.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
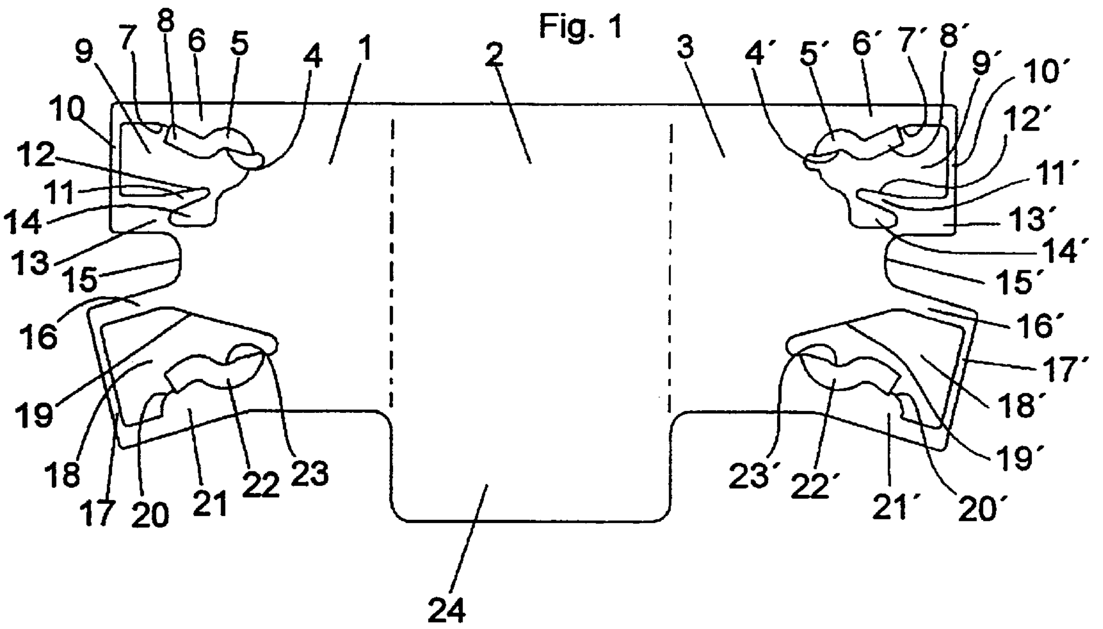
FIG. 1 is an expanded plan view of the connecting device for the connection of two components to each other according to an embodiment of the invention in the form of a shackle.

Referring now to FIG. 1, a connecting device for the connection of two components to each other includes a first lever 1, a second lever 3 and a bridging element 2 which connects the two levers 1 and 2 to each other, together constituting a single shackle 1, 3, 2. First lever 1 is provided with a first opening 4 configured to receive a first axle which is located on the first component of the two components to be connected to each other. First opening 4 is continuous with an insertion cut-out 9 which extends perpendicular to a longitudinal axis of first lever 1. Starting at the free end of first lever 1 away from bridging element 2, insertion cut-out 9 is tapered in the direction of first opening 4. A first leg 6, and a second leg 13 across from first leg 6 are formed on first lever 1 adjacent to, and defining a boundary of, first opening 4 and insertion cut-out 9. The free ends of legs 6 and 13 are connected to each other by a ridge 10, defined by structure formed at a terminal end of first lever 1, which structure is bent outward in the direction of the first component. Ridge 10 is provided with a hole continuous with insertion cut-out 9. The structure comprising ridge 10 prevents deformation of legs 6 and 13 when the first axle is introduced into first opening 4. Insertion cut-out 9 is thereby delimited by walls 7 and 12 of the two legs 6 and 13 facing each other, and which extend towards each other at an angle of taper in the direction of first opening 4. Second leg 13 is provided with an indentation 14 at wall 12, which begins in an area of transition from first opening 4 to insertion cut-out 9 and extends in the direction of the free end of second leg 13 at an angle into second leg 13. Indentation 14 defines a tongue-like part 11 which serves as an elastically deformable area of wall 12 delimiting insertion cut-out 9. The distance between at least one partial area of tongue-like part 11 and wall 7 across from it is selected to be shorter than the diameter of the first axle. This partial area is preferably in the transitional area from insertion cut-out 9 to first opening 4. A projection extending parallel to the first axle and projecting away from the first leg 6 is made in the form of a bearing cup 5 and an enlarged running surface 8 for the first axle, and follows the area of wall 7 bearing the axle delimiting first opening 4 and insertion cut-out 9. First opening 4 and the first axle received therein constitute a first rotating articulation 4, 28 by means of which first lever 1 can be rotatably connected to the first component relative to the first component.

A second opening 23 is provided in first lever 1, located on an imaginary arc of a circle around the first rotating articulation 4, 28 and configured to receive a first peg which is located on the second one of the two components to be connected to each other. Analogous to first opening 4, second opening 23 is continuous with an insertion cut-out 18 extending perpendicular to the longitudinal axis of first lever 1 which tapers from the free end of first lever 1 in the direction of second opening 23. A third leg 16, and a fourth leg 21 across from third leg 16, are formed in first lever 1 adjacent to, and defining a boundary of, second opening 23 and insertion cut-out 18. The free ends of the two legs 16 and 21 are connected to each other by means of a ridge 17, the structure of which inhibits deformation of legs 16 and 21 when the peg is introduced into second opening 23. Ridge 17 is defined by the end of first lever 1, which is bent to the outside in the direction of the first component, and has a hole which is continuous with insertion cut-out 18. A partial area of insertion cut-out 18 is delimited by two walls 19 and 20 of the two legs 16 and 21 facing one another and which converge at an angle of taper extending in the direction of second opening 23. A projection extending away from fourth leg 21, and running parallel to the first peg of the second component to be connected, is provided on the area of wall 20 delimiting second opening 23 and insertion cut-out 18 and bearing the peg installed on the second component, and serves as an enlarged running surface and a support 22 for the peg. Together with wall 20, fourth leg 21 constitutes a first holding element 21, 20 for engaging the first peg which functions as a first additional holding on the second component, during connection of the two components. An indentation 15 is provided between second leg 13 and the third leg 16 at the free end first lever 1.

Second lever 3 extending from bridging element 2 of shackle 1, 3, 2 is structurally configured as an inverted mirror image of first lever 1. Further description of the second lever 3 is therefore omitted as redundant. For the sake of greater clarity, second lever 3 is given the same reference numbers as the first lever 1, wherein, every reference number is however given a prime designation in the form of a single quotation mark.

Bridging element 2 of shackle 1, 3, 2 is provided with an area bent at the top thereof, and which serves as a handle 24 for the convenient actuation of the connecting device.

Figure 2:
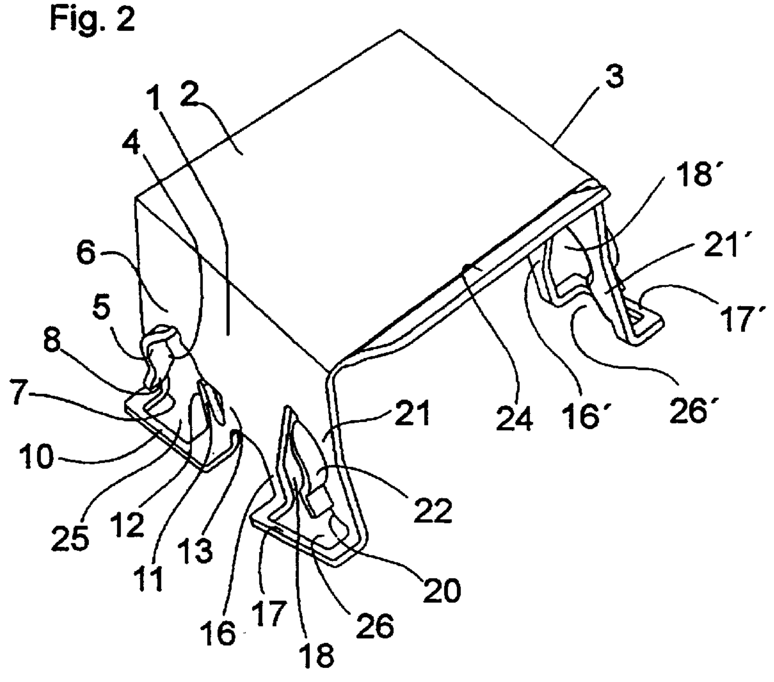
FIG. 2 is a perspective view of the connecting device of FIG. 1.

Turning now to FIG. 2, a perspective view of the connecting device for the connection of two components to each other in accordance with the above embodiment of the invention is shown. For the sake of greater clarity, the parts of the device which are structurally identical to those shown in FIG. 1 are given the same reference numbers.

The connecting device shown, and taking the form of a shackle, is made of a strip of steel sheet metal, the ends of which are bent in the same direction through deformation. The two bent ends, running parallel to each other, constitute first lever 1 and second lever 3. The central area constitutes bridging element 2 which connects the two levers 1 and 3 to each other. Ridge 10 connecting first leg 6 and second leg 13 of first lever 1, and ridge 10' connecting first leg 6' and second leg 13' of second lever 3 are each provided with a hole 25 (the hole corresponding to second lever 3 not being shown in FIG. 2) which is continuous with a respective insertion cut-out 9 or 9'. In the same manner, ridge 17 connecting third leg 16 and fourth leg 21 of first lever 1, and ridge 17' connecting third leg 16' and fourth leg 21' of second lever 3 are each provided with a hole 26 or 26' continuous with insertion cut-out 18 or 18'. The two ridges 10 and 17 or 10' and 17' on each of the two levers 1 and 3 are formed at respective the ends thereof which are bent towards the outside through deformation, whereby the two ridges 10 and 17 or 10' and 17' are separated from each other by indentation 15 or 15' located between second leg 13 or 13' and third leg 16 or 16'.

As best seen in FIG. 2, the projection extending to the outside from first lever 1, and which constitutes bearing cup 5 and running surface 8 of the first axle installed on the first component, is provided on first leg 6. Bearing cup 5 and running surface 8 are formed through deformation of first leg 6 in an area thereof forming a boundary of first opening 4 and insertion cut-out 9. Similarly, running surface and support 22 of the first peg installed on the second component are formed by the projection on fourth leg 21 extending to the outside from fourth leg 21. Running surface and support 22 are formed by deformation of a partial area of fourth leg 21 which delimits second opening 23 and insertion cut-out 18.

Since second lever 3 of shackle 1, 3, 2 is configured analogously with first lever 1, the embodiments of the lever described above, and the construction measures mentioned with regard thereto, also apply to second lever 3.

Figure 3:
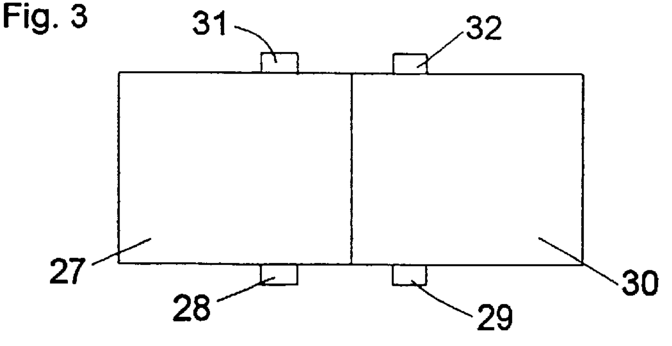
FIG. 3 is a plan view of the two components to be connected to each other, with the shackle of FIGS. 1 and 2 removed.

Referring now to FIG. 3, a first component 27 and a second component 30 are illustrated, depiction of the connecting device in form of shackle 1, 3, 2 used for the connection of the two components 27 and 30 being omitted. A first axle end serving as a first axle 28 is installed on one side of first component 27, and a second axle end serving as a second axle 31 on an opposite side of first component 27 is installed coaxially with the first axle end. The first additional holding element for interacting with the first holding element of the shackle is formed by a first peg 29 located on one side of second component 30, and the second additional holding element interacting with the second holding element of shackle 1, 3, 2 is formed by a second peg 32 which is located on an opposite side of second component 30. The two pegs 29 and 32 are advantageously arranged coaxially. Axles 28 and 31 located on first component 27 and pegs 29 and 32 located on second component 30 are constituted by the correspondingly configured projections of first component 27 and of second component 30.

Figure 4:
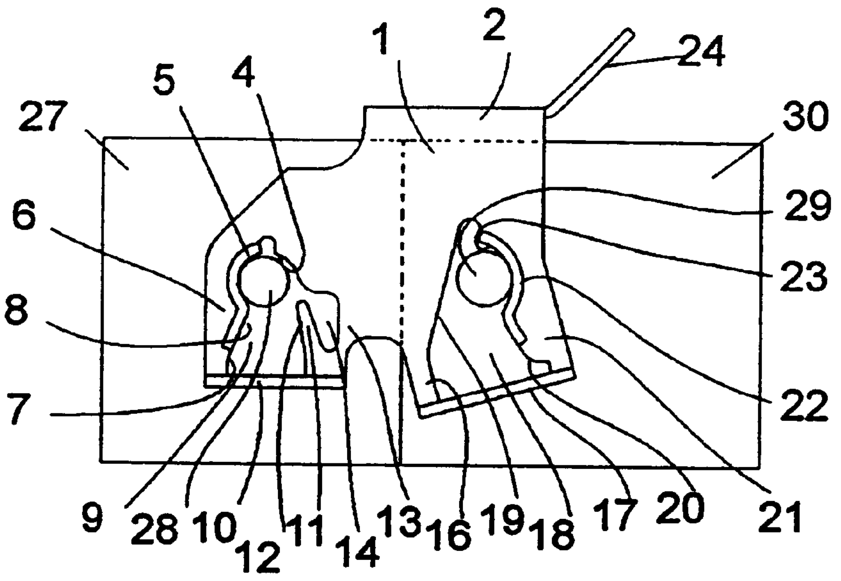
FIG. 4 is an elevational view of two components which are connected to each other by the connecting device of FIGS. 1 and 2 in the form of a shackle.

Turning now to FIG. 4, a lateral view of first component 27 and second component 30 is depicted, and includes the connecting device in the form of shackle 1, 3, 2 by means of which the two components 27 and 30 are connected to each other. It is noted that the description below with regard to FIG. 4 includes reference to second lever 3 of shackle 1, 3, 2 and the various corresponding elements included thereon, although same are not depicted in the figure.

First axle 28 and second axle 31 are installed on first component 27. The two pegs 29 and 32 are installed on second component 30 approximately at the same level as axles 28 and 31 on first component 27. Shackle 1, 3, 2 is pushed over the two components 27 and 30 in such manner that the two levers 1 and 3 extend laterally over the two components 27 and 30, with bridging element 2 separated a short distance from the two components 27 and 30.

First opening 4 of first lever 1, together with first axle 28 of first component 27 constitutes first rotating articulation 4, 28, and first opening 4' of second lever 3, together with second axle 31 of first component 27 constitutes a second rotating articulation 4', 31. Shackle 1, 3, 2 is installed by means of the two rotating articulations 4, 28 and 4', 31 on first component 27 in such manner as to be rotatable relative thereto. In the position of shackle 1, 2, 3 as depicted, first holding element 21, 20 located on first lever 1 extends over first peg 29 located on second component 30, first peg 29 serving as a first additional holding element. Similarly, second holding element 21', 20' on second component 30 extends over second peg 32 located on second component 30, and which serves as a second additional holding element.

It is noted, that if only a simple lever, rather than a connecting device in form of a shackle, is desired for the connection of two components to each other, then such device is configured in accordance with the guidelines given with respect to each of the two levers 1 or 3 of the device described above.

Figure 5:
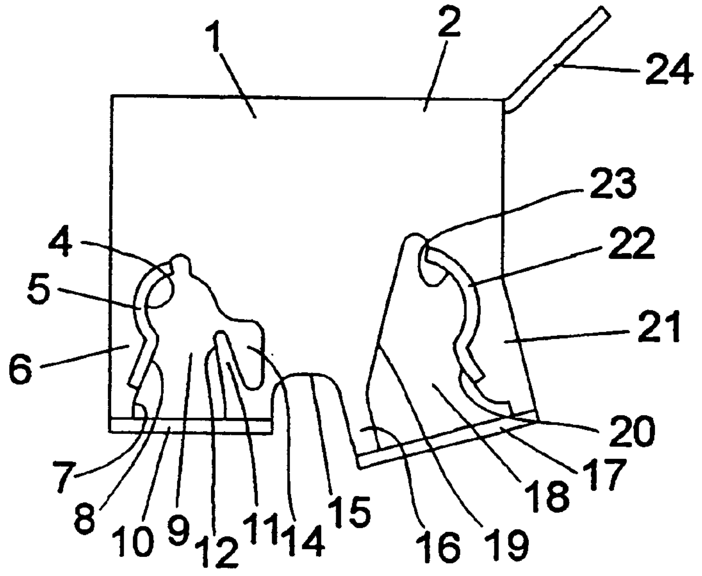
FIG. 5 is an elevational view of a connecting device for the connection of two components to each other according to another embodiment of the invention in the form of a simple lever.

Such a device for the connection of two components to each other and consisting of one single lever is shown in FIG. 5. Since the lever shown in FIG. 5 is configured exactly as first lever 1 and second lever 3 of the device shown in FIG. 1, no additional description of the lever shown in FIG. 5 is deemed necessary. For purposes of clarity, the lever shown in FIG. 5 is given the same reference numbers as first lever 1 of the device according to FIG. 1 in the form of shackle 1, 3, 2.

Mounting of the connecting device in accordance with the invention to two components to be interconnected is described below, in which the description is made with regard to an embodiment thereof in the form of a shackle.

The mounting process is initiated by pushing shackle 1, 3, 2 downward onto first component 27. During this process, first axle 28 passes through hole 25 in ridge 10, which provides clearance therefor, and into insertion cut-out 9 of first lever 1, and second axle 31 similarly passes through the hole in ridge 10' and into insertion cut-out 9' of second lever 3. During the mounting thereof to first component 27, shackle 1, 3, 2 moves along a forced pathway, guided by walls 7 and 12 which delimit insertion cut-out 9 of first lever 1, by running surface 8 and by first axle 28, as well as by walls 7' and 12' delimiting insertion cut-out 9' of second lever 3, running surface 8' and second axle 31. Shackle 1, 3, 2 is pushed a distance onto first component 27 until the transitional area extending from insertion cut-out 9 to first opening 4 of first lever 1 is seated on first axle 28, and the transitional area extending from insertion cut-out 9' to the first opening 4' of second lever 3 is seated on second axle 31. Additional pressure is then exerted on shackle 1, 3, 2 in the direction of axles 28 and 31 on shackle 1, 3, 2 to effect elastic deformation of the elastically deformable tongue-like part 11 of first lever 1 by contact with first axle 28, and of the elastically deformable tongue-like part 11' of second lever 3 by contact with second axle 31, thereby widening the passages delimited by the above-mentioned transitional areas. First axle 28 then enters first opening 4 of first lever 1 and second axle 31 enters first opening 4' of second lever 3. As soon as the two axles 28 and 31 have cleared the respective transitional regions of the first and second levers 1 and 2, and have each been received in a corresponding opening 4 or 4', the elastically deformable tongue-like parts 11 and 11' return to their starting position prior to deformation. The two axles 28 and 31 and tongue-like parts 11 and 11' interact to function in practice in the manner of a snap-on connection. In addition, once the two axles 28 and 31 have been respectively received in openings 4 and 4', tongue-like parts 11 and 11' act as stops which limit movement of axles 28 and 31 in the direction of insertion cut-outs 9 and 9', thereby inhibiting unintentional detachment of shackle 1, 3, 2 from first component 27.

To complete connection of first component 27 to second component 30, facing sides of both components 27 and 30 are brought into contact with one another, as shown in FIG. 3. Prior to initiating this process, shackle 1, 3, 2, along with holding elements 21, 20 and 21', 20' provided thereon, is rotated away from second component 30 about the two axles 28 and 31. Following contact engagement of the sides of the two components 27 and 28, shackle 1, 3, 2, along with holding elements 21, 20 and 21', 20' provided thereon, is rotated in the direction of second component 30 around axles 28 and 31.

First peg 29 on second component 30, which serves as a first additional holding element, thereby enters the insertion cut-out 18 through hole 26 located in ridge 17 of the first lever 1 and continuous therewith, and second peg 32, which serves as a second additional holding element located on second component 30, thereby enters insertion cut-out 18' through hole 26' located in ridge 17' of second lever 3 and which is continuous therewith. Due to the fact that wall 20 delimiting insertion cut-out 18 of first lever 1, and wall 20' delimiting insertion cut-out 18' of second lever 3, extend at an angle in the direction of corresponding pegs 29 or 32 on second component 30, shackle 1, 3, 2 comes to rest on the transitional area going from insertion cut-outs 18 and 18' to openings 23 and 23'. When additional pressure is exerted on shackle 1, 2, 3 in the direction of pegs 29 and 32, pegs 29 and 32 are forcibly guided into their respective openings 23 and 23'. Holding elements 21, 20 and 21', 20' located on levers 1 and 3, and pegs 29 and 32 which serve as additional holding elements and are located on the second component 30, thus interact in practice to function as a snap-on connection. During this step in the mounting process, the two pegs 29 and 32 clear the transitional region to enter openings 23 and 23' by means of elastic deformation of interfering structure. Such structure which may be elastically deformed, may include for example, the two pegs 29 and 32 themselves, a seal located between the sides facing each other of the two components 27 and 30, or holding elements 21, 20 and 21', 20' on shackle 1, 3, 2.

The holding element on the lever which interacts with the additional holding elements on the second component, can alternatively be provided in the form of a hook, located on an imaginary arc of circle around the rotating articulation of the lever. Third leg 16 or 16', second opening 23 or 23', and insertion cut-out 18 or 18' connected thereto, are then no longer required. The projection on fourth leg 21 or 21' serving as enlarged running surface and support 22 is however kept.

The device which consists of either one single lever or of a shackle with two levers for the connection of two components to each other can be produced, for example, by punching out and deformation of a strip of sheet metal. It is also possible to produce the device according to the invention in the form of an extruded plastic part.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for connecting a first component to a second component in abutted contact therewith, the first component including a first axle extending from a first side of the first component, the device comprising:

a first lever including rotating articulation means for providing rotating articulation carried on the first lever and cooperative with the first axle of the first component to be connected, the rotating articulation means including a first lever axle opening in which the first axle of the first component to be connected is rotatably receivable;

the first lever further including a first holding element for engaging a first additional holding element when the first lever is rotated about the first axle of the first component to be connected in a direction of the second component to be connected, the first additional holding element extending from a first side of the second component to be connected facing a direction common with the first side of the first component to be connected when the first and second components are brought into abutted engagement for connection to one another;

the first lever further including a first lever axle insertion cut-out continuous with the first lever axle opening configured to permit insertion therein of the first axle of the first component to be connected, a boundary of the first lever axle insertion cut-out being defined by two walls opposed to one another;

one of the two walls presenting an elastically deformable area therealong, the elastically deformable area being disposed in a region adjacent the first lever axle opening, a distance between at least a partial area of the elastically deformable area and a remaining one of the two walls across therefrom being shorter than a diameter of the first axle of the first component to be connected;

the boundary of the first lever axle insertion cut-out being further defined by a first leg and a second leg formed on the first lever;

wherein the elastically deformable area is provided on a wall of at least one of the first and second legs facing the first axle of the first component to be connected;

wherein the first and second legs are connected to each other by a ridge, the ridge being defined by an end of the first lever to be bent away from the first component to be connected and provided with a hole continuous with the first lever axle insertion cut-out; and wherein one of the two walls delimiting the first lever axle insertion cut-out includes an indentation formed therein which defines a tongue-like part, the elastically deformable area being comprised of the tongue-like part.

2. A device according to claim 1, wherein the first component to be connected includes a second axle extending from an opposite side of the first component, the device further comprising:

a second lever including rotating articulation means for providing rotating articulation carried on the second lever and cooperative with the second axle of the first component to be connected, the rotating articulation means including a second lever axle opening in which the second axle of the first component to be connected is rotatably receivable;

the second lever further including a second holding element for engaging a second additional holding element when the second lever is rotated about the second axle of the first component to be connected in a direction of the second component to be connected, the second additional holding element extending from a second side of the second component to be connected facing a direction common with the opposite side of the second component to be connected when the first and second components are brought into abutted engagement for connection to one another;

the second lever further including a second lever axle insertion cut-out continuous with the second lever axle opening configured to permit insertion therein of the second axle of the first component, a boundary of the second lever axle insertion cut-out being defined by two second lever walls opposed to one another;

one of the two second lever walls presenting an elastically deformable area therealong, the elastically deformable area being disposed in a region adjacent the second lever axle opening, a distance between at least a partial area of the elastically deformable area and a remaining one of the two second lever walls across therefrom being shorter than a diameter of the second axle of the first component to be connected;

the boundary of the second lever axle insertion cut-out being further defined by a first leg and a second leg formed on the first lever;

wherein the elastically deformable area is provided on a wall of at least one of the first and second legs facing the second axle of the first component to be connected;

wherein the first and second legs are connected to each other by a ridge, the ridge being defined by an end of the first lever to be bent away from the first component to be connected and provided with a hole continuous with the second lever axle insertion cut-out;

wherein one of the two walls delimiting the second lever axle insertion cut-out includes an indentation formed therein which defines a tongue-like part, the elastically deformable area being comprised of the tongue-like part;

wherein a bridging element interconnects the first lever and the second lever; and the combination of the first lever, the second lever and the bridging element together constituting a shackle.

3. A device according to claim 1, wherein at least one of the two walls of the first lever delimiting the first lever axle insertion cut-out extends at an angle from a free end of the first lever axle insertion cut-out to the first lever axle opening.

4. A device according to claim 1, further comprising:

support means for bearing pressure forces exerted by the first axle of the first component to be connected on an opening wall delimiting the first lever axle opening and one of the two walls delimiting the first lever axle insertion cut-out, the support including a running surface and a bearing cup extending at least partially along the opening wall and the one of the two walls, the running surface and the bearing cup being defined at least in part by a projection on the second lever which is approximately parallel to the first axle of the first component to be connected.

5. A device according to claim 1, wherein:

the first lever includes a second opening and a second insertion cut-out continuous therewith;

the second insertion cut-out is delimited by two second insertion walls of the first lever across from one another, the holding element being comprised of one of the two second insertion walls;

wherein a boundary of the second opening and the second insertion cut-out which is continuous therewith are defined by a third leg and a fourth leg formed on the first lever, the holding element being carried of the fourth leg of the first lever; and wherein the third leg and the fourth leg are connected to each other by a ridge, the ridge being defined by an end of the first lever bent away from the first component to be connected and provided with a second hole continuous with the second insertion cut-out.

6. A device according to claim 5, wherein at least one of the two second insertion walls delimiting the second insertion cut-out extends at an angle from a free end of the second insertion cut-out to the first additional holding element such that the first holding element and the first additional holding element on the second component to be connected cooperate in a manner providing a snap-on engagement.

7. A device according to claim 5, further comprising:

second support means for absorbing pressure forces exerted by the first additional holding element on the first lever, the second support means including an enlarged running surface and a support for contacting the first additional holding element defined by a projection on the first lever extending approximately parallel to a longitudinal axis of the first additional holding element which extends at least partially along a wall delimiting the second opening and one of the two second insertion walls of the first holding element delimiting the second insertion cut-out.

8. A device according to claim 1, wherein the holding element includes a hook carried on the first lever.

9. A device according to claim 1 wherein the device is in the form of a sheet metal part, whereby apertured portions of the lever are produced by punching out, and projecting structures are produced through deformation of a partial area of the sheet-metal part.

10. A device according to claim 2 wherein the device is in the form of a sheet metal part, whereby apertured portions of the shackle are produced by punching out, and projecting structures are produced through deformation of a partial area of the sheet-metal part.

11. A device according to claim 1, wherein the device is made in a form of a plastic extrusion part.

12. A device according to claim 2, wherein the device is made in a form of a plastic extrusion part.

* * * * *